United States Patent [19]
Kuntz

[11] Patent Number: 5,277,806
[45] Date of Patent: Jan. 11, 1994

[54] LIQUID CLARIFIER

[75] Inventor: James Kuntz, Spokane, Wash.

[73] Assignee: Spokane Industries, Inc., Spokane, Wash.

[21] Appl. No.: 982,828

[22] Filed: Nov. 30, 1992

[51] Int. Cl.⁵ .............................................. B01D 63/00
[52] U.S. Cl. .................................. 210/321.72; 210/521
[58] Field of Search .................... 210/788, 268, 321.6, 210/321.72, 305, 306, 513, 521, 522

[56] References Cited

U.S. PATENT DOCUMENTS

| | | | |
|---|---|---|---|
| 4,624,782 | 11/1986 | Gould | 210/268 |
| 4,855,065 | 8/1989 | Keeter et al. | 210/788 |

Primary Examiner—Frank Sever
Attorney, Agent, or Firm—Wells, St. John, Roberts, Gregory & Matkin

[57] ABSTRACT

A liquid clarifier in the form of an enclosure in which a conical filter membrane is mounted. An inlet is mounted to the enclosure below the conical filter membrane and an outlet is mounted to the enclosure above the membrane so than an upflow of liquid is created during filtering. The upflow causes the liquid to sweep across the conical filter membrane to prevent accumulation of particulate matter on the membrane. A conical baffle is coupled to the inlet to reduce turbulence of the liquid at a lower end of the enclosure to promote separation by gravity of the particles from the liquid.

18 Claims, 3 Drawing Sheets

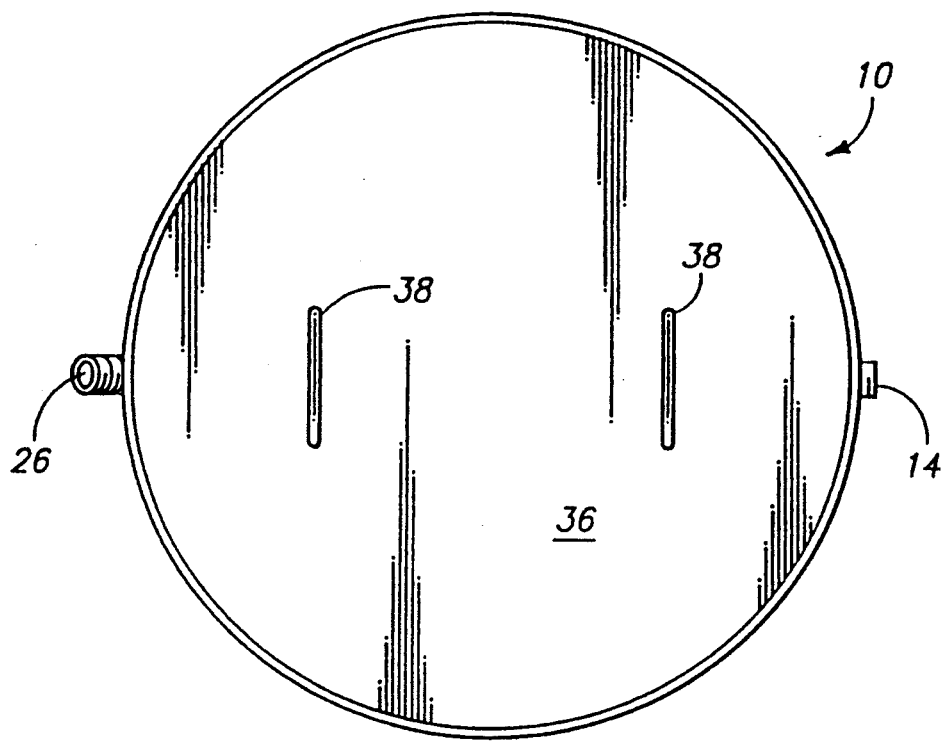
$Fig.2$
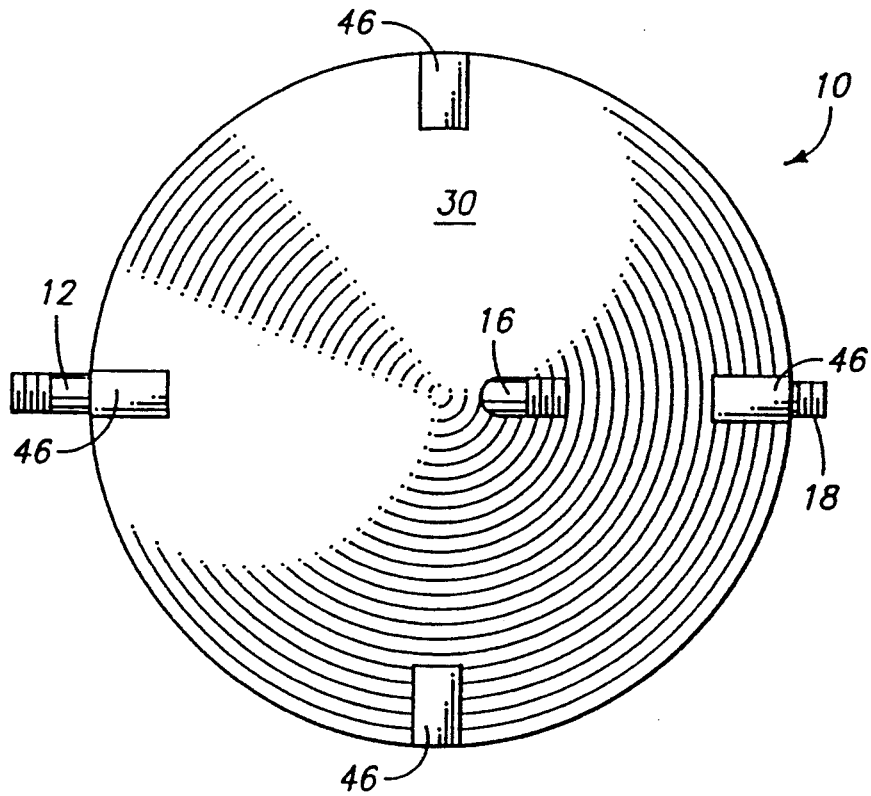
$Fig.3$

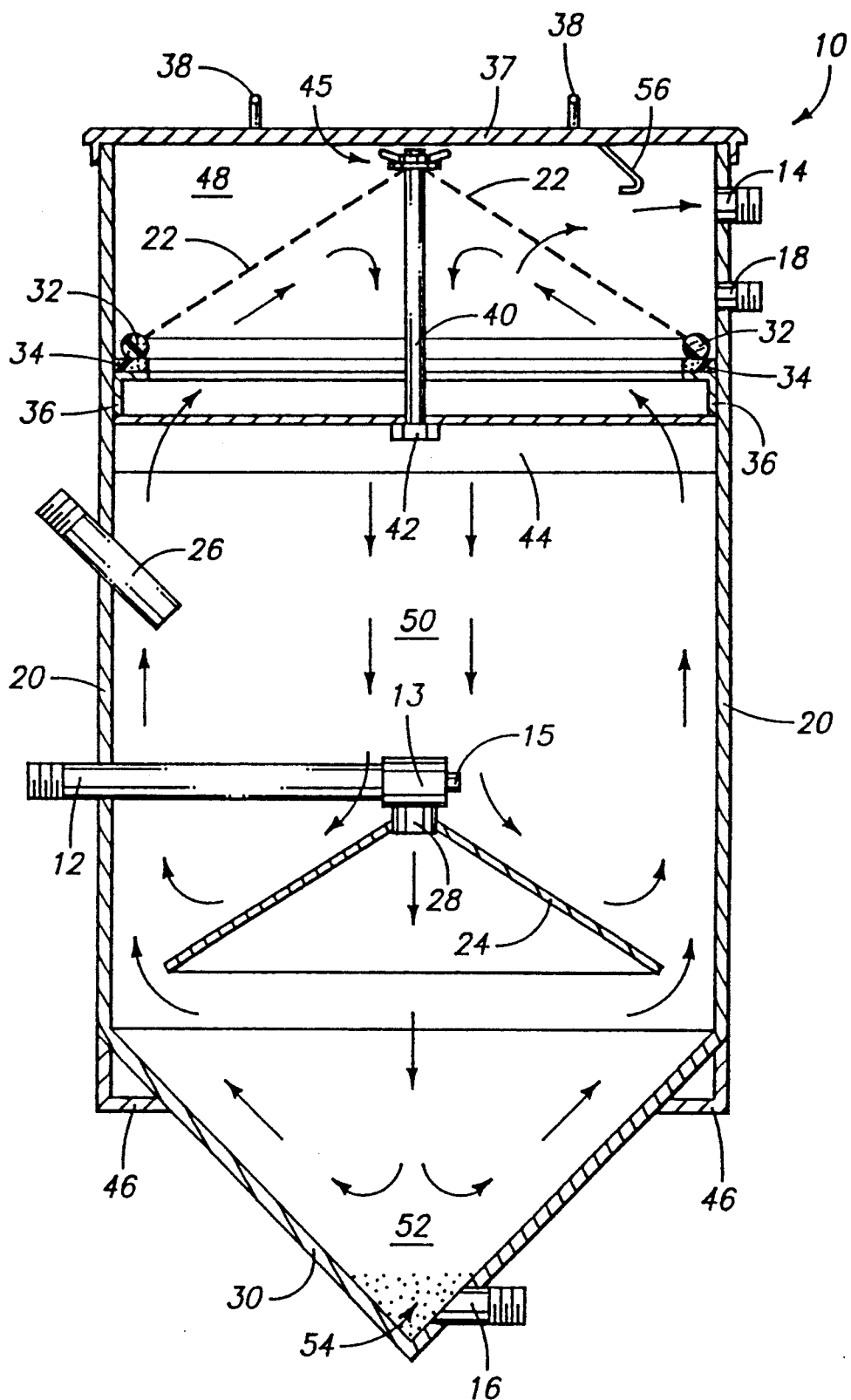
_FIG 4_

LIQUID CLARIFIER

TECHNICAL FIELD

This invention relates to devices for separating particulate matter from liquids.

BACKGROUND OF THE INVENTION

Many known filtering devices are used to separate particulate matter from liquids. A need for filtering devices exists in many different industries and environments. Filtering devices are commonly made to separate a wide range of particle sizes from liquid and are manufactured to meet almost any specific application.

A universal problem with respect to filtering devices relates to clogging of or accumulation of particulate matter on the filter media. Typical methods for removing the accumulated particulate matter from the filter media include physically removing the particulate matter, and backflushing the filter media by introducing a reverse flow through the filter.

In spite of these known methods, there remains a need to prevent the accumulation of particulate matter on the filter media, particularly during the filtration process, and thereby reduce the frequency of clogging and obstruction of flow through the filter media. It is highly time consuming and inefficient to either backflush the filtering device or physically remove particulate matter from the filter media each time an excess accumulation of particulate matter occurs. Traditional filtering mechanisms have yet to provide an adequate solution to this common problem.

Yet another problem with respect to traditional filtering devices is that they are not versatile in that only a maximum, predetermined particle size can be separated by filtering device. Accordingly, there is a need to provide a filtering device wherein the filter means can be quickly and readily changed so that a variety of particle sizes can be separated from the liquid.

Still another problem with respect to certain traditional settling filters is that the flow of liquid within the filtering chamber creates turbulence which works against separation of particulate matter by gravity. There remains a need to provide a means of reducing the turbulence of the liquid at desired areas within the filtering device to promote separation of particulate matter by gravity.

The foregoing problems have been overcome by the present invention, which involves a liquid clarifier in the form of an enclosure in which a conical filter membrane is mounted. An inlet is mounted to the enclosure below the conical filter membrane and an outlet is mounted to the enclosure above the membrane so than an upflow of liquid is created during filtering. The upflow causes the liquid to sweep across the conical filter membrane to prevent accumulation of particulate matter on the membrane. A conical baffle is coupled to the inlet to reduce turbulence of the liquid at a lower end of the enclosure to promote separation by gravity of the particles from the liquid. Other features and advantages of the present invention will become apparent from the disclosure below.

BRIEF DESCRIPTION OF THE DRAWINGS

Preferred embodiments of the invention are described below with reference to the accompanying drawings, which are briefly described below.

FIG. 2 is a top plan view of the liquid clarifier of FIG. 1.

FIG. 3 is a bottom view of the liquid clarifier of FIG. 1.

FIG. 4 is a sectional side elevation view of the clarifier of FIG. 1 showing the directions of flow of the liquid within the clarifier.

DETAILED DESCRIPTION OF THE PREFERRED EMBODIMENTS

Figure 1:
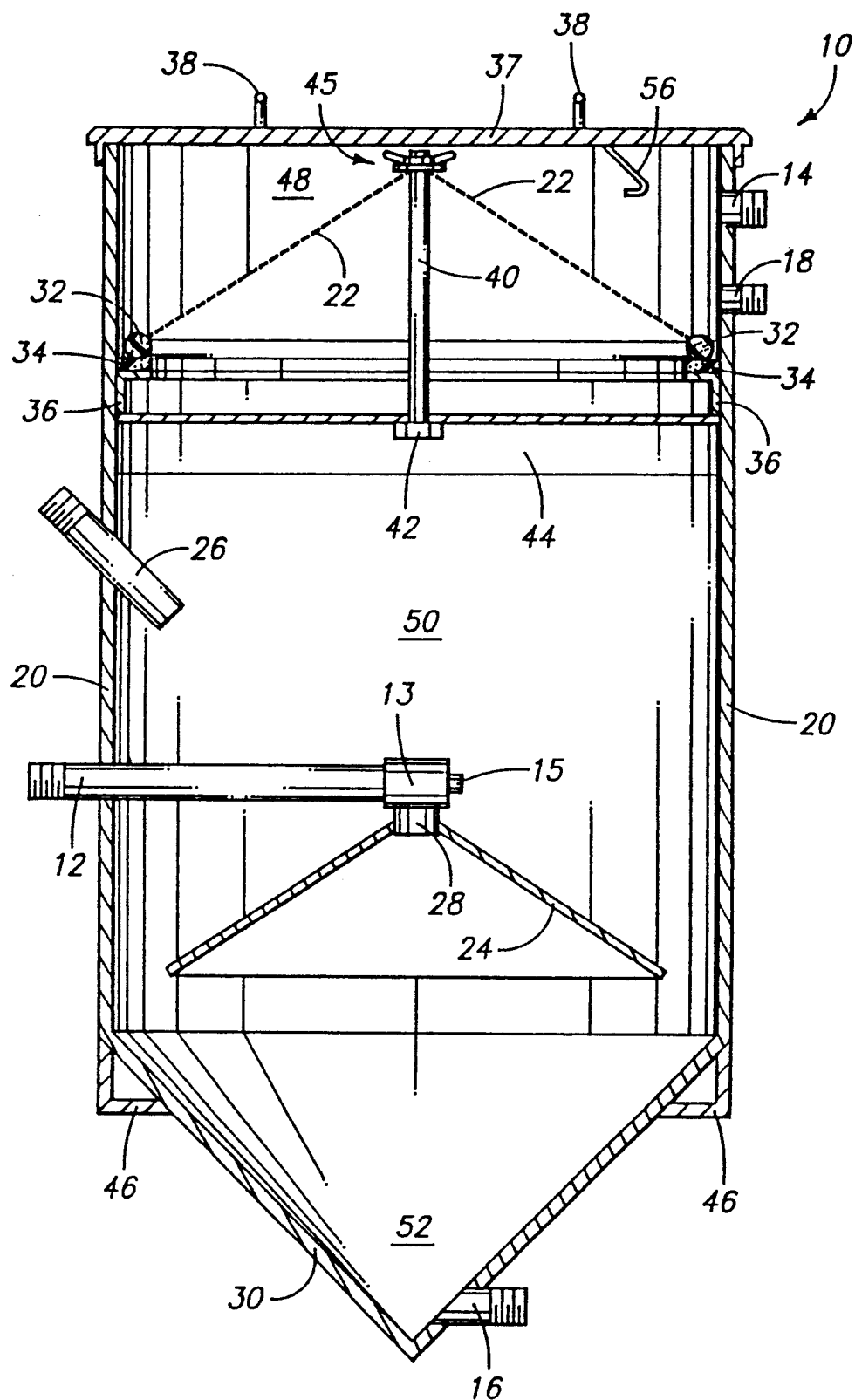
FIG. 1 is a sectional side elevation view of a preferred embodiment of a liquid clarifier according to the present invention.

This disclosure of the invention is submitted in furtherance of the constitutional purposes of the U.S. Patent Laws "to promote the progress of science and useful arts" (Article 1, Section 8).

FIG. 1 shows a preferred embodiment of the present invention, which involves a liquid clarifier 10 in which liquids having suspended particulate matter are introduced for the purpose of separating the particles. The liquid clarifier 10 can be used in any number of specific applications, such as for separating heavy metals, shavings, and the like from liquid. The liquid clarifier can also be used in boat yards to separate and contain materials that have washed off the bottom of boats. The liquid clarifier can be used in conjunction with sumps in utility applications, at vehicle wash stations to separate particulate contamination from the wash water, in mining applications to remove debris and particulate matter from wastewater in mines, and many other applications.

The clarifier generally comprises a containment means in the form of an enclosure 20. A main inlet 12 is coupled to the enclosure for allowing liquids to be introduced into the clarifier. A main outlet 14 is provided at a location upward of the inlet 12 so that the flow of liquid is generally from a lower to a higher elevation. The outlet 14 allows filtered liquid to pass outside of the enclosure 20. Also included in the enclosure is a drain 16 located at the bottom of the enclosure for removing sludge and other particulate matter that has settled out by gravity from the liquid.

Located just below the main outlet 14 is a decanting pipe 18, which can be used to drain liquid above the pipe 18 to the outside of enclosure 20. The lid 37 is then removed so that the filter membrane 22 can be hosed down from above to separate the particulate matter from the membrane 22. The particulate matter will then fall toward the bottom of the clarifier for removal through the drain 16. During the cleaning process, the main outlet 14 is closed, the inlet pipe 12 is closed, and the drain 16 is opened.

A conical filter membrane 22 is disposed within the enclosure 20 of the liquid clarifier 10. The filter membrane acts as a primary filtering means. The filtering ability of the filtering membrane, in terms of particle size, can vary depending upon the specific use for which it is intended. Typical uses involve a membrane that can filter anywhere from five to fifteen microns.

Referring still to FIG. 1, the conical membrane 22 is secured at one end to an annular ring 32 and at an opposite side to a wing nut/washer arrangement 45. The membrane 22 and annular ring 32 are inserted over the rod 40, after which the wing nut assembly 45 is tightened to lock the membrane 22 in position. The annular ring rests on top of a seal 34, which is preferably made of foam, but could alternatively be constructed with any suitable material. The seal 34 ensures that no liquid passes between the outside of the ring 32 and the inner wall of the enclosure 10. Thus, all liquid passing through outlet 14 must first pass through the filter membrane 22. The filter membrane 22 is secured within the enclosure by tightening wingnut assembly 45.

The membrane filter 22 can be easily exchanged with another filter for separating different size particles. This is accomplished by removing the lid 37, loosening wingnut assembly 45, and removing the combined ring 32 and filter membrane from the bolt 40.

The seal 34 rests on top of an angle ring 36 which provides a shelf for the foam seal. The angle ring 36 is preferably made of a circular piece of angle iron which has an outside diameter that corresponds to the inside diameter of the inner wall of the enclosure 22.

A cross member 44 is attached to the enclosure 20 at opposite sides so as to intersect the longitudinal axis of the enclosure 20 and provide a mounting location for the bolt 40. The bolt 40 is aligned to correspond with the longitudinal axis of the enclosure. One end of the bolt 40 passes through an aperture in the cross member and is secured in place by means of a nut 42. The bolt 40 and nut 42 may be welded to the cross bar, or attached to the cross bar by any suitable means. The cross bar 44 is preferably made of angle iron, but could also be made of any conventional structural member.

An access port 26 is provided in one side of the enclosure 20 to allow a measuring instrument to be inserted into the liquid clarifier. For example, a pH measuring instrument could be inserted into access port 26 to provide a pH measurement of the liquid within the clarifier. Any other suitable measuring means could also be inserted into the tank by means of access port 26. When not being used, the access port 26 is sealed at a threaded portion extending outwardly from the clarifier.

The inlet pipe 12 passes through the enclosure 20 and is coupled to a standard tee intersection 13. A pipe plug 15 is usually inserted into the opening of the tee opposite the inlet pipe 12. Extending perpendicularly from the inlet pipe 12 is an inlet port 28 through which liquid entering into the clarifier will flow. Coupled about the inlet port 28 is a baffle means 24 which extends radially outwardly and downwardly from the inlet port 28. The baffle extends toward the periphery of the enclosure 20 but does not, however, contact the edges of the enclosure 20. This provides a peripheral area around the baffle for allowing liquid to flow toward the filter membrane 22 and the outlet pipe 14. The spacing distance between the edge of the baffle and the wall of the enclosure 20 will vary, depending upon the solution being filtered, but will generally be between 6 to 8 inches.

The liquid clarifier can include a conical bottom portion 30 extending downwardly from the outside walls of the enclosure 20. The conical base portion 30 is in the form of an inverted apex with the walls of base portion 30 converging to a bottom point. The conical base portion 30 concentrates the sludge 54 (FIG. 4) settling out by gravity from the liquid within the enclosure. The sludge 54 is removed from the enclosure via drain 16. A plurality of support brackets 46 are mounted to the conical base portion 30 to provide a means for supporting the liquid clarifier 10.

A lid 37 is removably positioned over the top access opening of the enclosure 20. The lid serves to provide quick and easy access into the enclosure, yet prevents impurities from entering into the liquid that has passed through the filter membrane 22. One of the primary reasons for quick, easy access is to allow the filter membrane 22 to be replaced or serviced. The size of the lid is complimentary to the size of the enclosure 20 such that the lid fits securely about the periphery of the enclosure 20.

In a preferred embodiment, the liquid is introduced into the liquid clarifier 10 through the inlet pipe 12. The liquid is under a small amount of pressure (e.g., 2 to 3 lbs.) which allows the liquid to fill the enclosure. After passing through the membrane 22, the liquid passes by gravity through outlet 14 to the outside of the clarifier. The weight of the lid, alone, is generally sufficient to hold the lid in place because of the small amount of pressure needed to cause the liquid to flow through the clarifier. Liquid will flow out of the outlet pipe 14 prior to creating any significant upward pressure on the lid.

The lid is advantageously equipped with a pair of handles 38 which facilitate removal and installation of the lid 37. Further, a hook 56 is welded to the bottom side of the lid 37 to provide a means for hanging lid at the side of the enclosure 20 when access into the enclosure is necessary.

With reference to FIG. 4, the various flows of the liquid within the clarifier are shown. Initially, liquid is allowed to enter into the clarifier 10 by means of inlet pipe 12. The liquid passes through the tee intersection 13 and downwardly through inlet port 28. The baffle 24 provides a hood around which the liquid must flow. This promotes settling of most of the heavy particles before the liquid starts to flow upwardly.

After the liquid has passed to the extreme periphery of the enclosure 20, the liquid flows upward along the sides of the enclosure 20 until it encounters the filter membrane 22. The liquid filters through the membrane 22 and passes in a purified state through outlet pipe 14. The particles, which do not pass through membrane 22, eventually either fall back down toward the bottom of the enclosure 20 to form sludge 54, or accumulate on the under side of membrane 22. However, the flow of the liquid across the membrane causes a sweeping action which causes the particles to break loose from the filter membrane and creates a self-cleaning effect.

The sweeping flow of liquid is repeated from the recirculation of the liquid after it has passed over the inside surface of membrane 22. The arrows show this recirculation in a middle region 50 of the clarifier. This circulation of the liquid allows the liquid to pass along debris and particles that have collected in the membrane and break them loose so they can settle out as sludge 54 in settling chamber 52 of the clarifier 10. Only completely filtered liquid is allowed to pass upwardly through the membrane 22 into a clean liquid chamber 48.

To enhance the effect of the sweeping action of the liquid to "self-clean" the filter membrane, the liquid may be intermittently introduced into the enclosure through the inlet. The intermittent introduction of liquid into the enclosure 22 can be accomplished by any conventional means. For example, the clarifier 10 could be used in conjunction with a sump pump which operates only when necessary to introduce liquid from an outside source into the clarifier 10 for clarifying. The sporadic flow of liquid from the sump pump to the inlet 12 varies the turbulence of the liquid within the tank and the speed at which the liquid sweeps across the filter membrane 22. This enhances separation of the particulate matter from filter membrane 22 by allowing the particulate matter to fall by gravity toward the bottom of the enclosure 20 when the sweeping speed of the liquid across the filter membrane 22 is reduced.

The upflow of liquid through the filter membrane, the sweeping action of the liquid across the filter membrane, and the intermittent flow of liquid into the clarifier advantageously create a self-cleaning effect that allows the clarifier to operate for extended hours and require less periodic maintenance.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A device for clarifying liquid, comprising:
   an enclosure for holding liquid;
   an inlet coupled to the enclosure, said inlet controllably allowing liquid to enter into the enclosure;
   an outlet coupled to the enclosure above said inlet, said outlet allowing filtered liquid to pass outside of the filter;
   a filter membrane disposed within the enclosure and designed and positioned above said inlet and below said outlet such that an upflow of liquid along the membrane causes the liquid to sweep across the filter membrane to prevent particulate matter from accumulating on said filter membrane.

2. The liquid clarifying device of claim 1 wherein the filter membrane is a conical filter membrane.

3. The liquid clarifying device of claim 1 wherein the filter membrane is a conical filter membrane having an apex with downwardly sloping walls terminating in an annular base, the conical filter membrane being mounted inside the enclosure with the apex positioned above the base, wherein the liquid passes upwardly to sweep across the conical membrane to free particulate matter from the membrane and prevent particulate matter from building up on said membrane.

4. The liquid clarifying device of claim 1 wherein the filter membrane is a conical filter membrane having an apex with downwardly sloping walls terminating in an annular base, the conical filter membrane being mounted inside the enclosure with the apex positioned above the base, wherein the liquid passes upwardly to sweep across the conical membrane to free particulate matter from the membrane and prevent particulate matter from building up on said membrane; and
   wherein the liquid is intermittently introduced into the enclosure through the inlet to vary the turbulence of the liquid within the tank, the liquid passing at a sweeping speed across the filter membrane to enhance separation of the particulate matter by allowing the particulate matter to fall from the filter membrane by gravity toward the bottom of the enclosure when the sweeping speed of the liquid is reduced.

5. The liquid clarifying device of claim 1 wherein the filter membrane is a conical filter membrane having an apex end and an open end, said membrane being mounted inside the enclosure so that the open end spans substantially an entire inside cross-sectional area of the enclosure; said apex end being positioned above the open end, the liquid passing through said liquid clarifying device in an upward flow, said upward flow of liquid preventing particulate matter from accumulating on said filter membrane.

6. The liquid clarifying device of claim 1, further comprising:
   a baffle positioned about the inlet, said baffle reducing the turbulence of the liquid within portions of the enclosure to promote separation of particulate matter by gravity.

7. The liquid clarifying device of claim 1, further comprising:
   a conical baffle having a narrowed end and an enlarged end, said narrowed end secured to the said inlet, said enlarged end extending downward and radially outwardly from said narrowed end, said enlarged end spaced from an inside wall of said enclosure to allow liquid entering into the enclosure through said inlet to pass between said enlarged end and said inside wall, said baffle reducing the turbulence of the liquid within portions of the enclosure to promote separation of particulate matter by gravity.

8. The liquid clarifying device of claim 1, further comprising:
   a baffle positioned about the inlet, said baffle reducing turbulence of the liquid within the enclosure to promote separation of particulate matter by gravity; and
   wherein the filter membrane is a conical filter membrane having an apex with downwardly sloping walls terminating in an annular base, the membrane being mounted inside the enclosure with the apex positioned above the base, wherein the liquid passes upwardly to sweep across the conical membrane to free particulate matter from the membrane and prevent particulate matter from building up on said membrane.

9. A liquid clarifying device of claim 1, further comprising:
   an access port coupled to the enclosure, said access port providing an access location for monitoring conditions within the enclosure.

10. A liquid clarifying device of claim 1, further comprising:
    a removable lid, said lid being complimentary in size to the periphery of the enclosure.

11. A liquid clarifying device according to claim 1, further comprising:
    a removable lid, said lid being complimentary in size to the periphery of the enclosure;
    a pair of handles mounted on top of the lid to allow a person removing the lid to grasp the lid with both hands for quick, easy removal; and
    a hook coupled to a bottom surface of the lid, said hook allowing the lid to be hanged to the side of the enclosure while the enclosure is being accessed.

12. A liquid clarifying apparatus according to claim 1 wherein the filter membrane is a conical filter membrane having an apex with downwardly sloping walls terminating in an annular base, the membrane being mounted inside the enclosure with the apex positioned above the base, wherein the liquid passes upwardly to sweep across the conical membrane to free particulate matter from the membrane and prevent particulate matter from building up on said membrane;
    wherein the annular base is mounted upon an annular seal which prevents liquid from passing between the filter and an inner wall of the enclosure.

13. The clarifying device of claim 1, further comprising:
- a drain coupled to the enclosure;
- wherein the enclosure includes a conical bottom portion comprised of narrowing walls which converge and terminate at a bottom point in the form of an inverted apex;
- wherein the conical bottom portion concentrates the particulate matter to form sludge which is removed from the enclosure by means of said drain.

14. The clarifying device of claim 1, further comprising:
- a drain coupled to the enclosure;
- wherein the enclosure includes a conical bottom portion comprised of narrowing walls which converge and terminate at a bottom point in the form of an inverted apex;
- wherein the conical bottom portion concentrates the particulate matter to form sludge which is removed from the enclosure by means of said drain;
- a plurality of support brackets coupled to an exterior wall of the conical bottom, said plurality of support brackets providing a support location for the enclosure.

15. The clarifying device of claim 1 wherein the filter membrane is readily removable and exchangeable so that various sizes of particles can be separated by the filter membrane.

16. A device for clarifying liquid, comprising:
- an enclosure for holding liquid;
- an inlet coupled to the enclosure, said inlet controllably allowing liquid to enter into the container;
- a conical filter membrane disposed within the enclosure, said filter membrane having an apex with downwardly sloping walls terminating in an annular base, the membrane being mounted inside the enclosure with the apex positioned above the base designed to enable the liquid to pass upwardly and sweep across the conical membrane to separate particulate matter from the membrane and prevent particulate matter from building up on said membrane, said filter membrane separating particulate matter from the liquid to clarify the liquid;
- an outlet coupled to the enclosure above said inlet, said outlet removing clarified liquid from the enclosure;
- said filter membrane being positioned above said inlet and below said outlet such that an upflow causes the liquid to sweep across said filter membrane to prevent particulate matter from accumulating on said filter membrane;
- a conical baffle having a narrowed end and an enlarged end, said narrowed end secured to the said inlet, said enlarged end extending downward and radially outwardly from said narrowed end, said enlarged end spaced from an inside wall of said enclosure to allow liquid entering into the enclosure through said inlet to pass between said enlarged end and said inside wall, said baffle reducing the turbulence of the liquid within the portions of the enclosure to promote separation of particulate matter by gravity;
- a drain coupled to the enclosure;
- wherein the enclosure includes a conical bottom portion comprised of narrowing walls which converge and terminate at a bottom point in the form of an inverted apex;
- wherein the conical bottom portion concentrates the particulate matter to form sludge which is removed from the enclosure by means of said drain.

17. The clarifying device of claim 16 wherein the liquid is intermittently introduced into the enclosure through the inlet to vary the turbulence of the liquid within the tank, the liquid passing at a sweeping speed across the filter membrane to enhance separation of the particulate matter by allowing the particulate matter to fall from the filter membrane by gravity toward the bottom of the enclosure when the sweeping speed of the liquid is reduced.

18. The clarifying device of claim 16, further comprising:
- a removable lid, said lid being complimentary in size to the periphery of the enclosure;
- a pair of handles mounted on top of the lid to allow a person removing the lid to grasp the lid with both hands for quick, easy removal;
- a hook coupled to a bottom surface of the lid, said hook allowing the lid to be hanged to the side of the enclosure while the enclosure is being accessed;
- wherein the liquid is intermittently introduced into the enclosure through the inlet to vary the turbulence of the liquid within the tank, the liquid passing at a sweeping speed across the filter membrane to enhance separation of the particulate matter by allowing the particulate matter to fall from the filter membrane by gravity toward the bottom of the enclosure when the sweeping speed of the liquid is reduced.

* * * * *